United States Patent
Crombez et al.

(10) Patent No.: US 7,735,913 B2
(45) Date of Patent: Jun. 15, 2010

(54) COVER FOR VEHICLE SEAT HANDLE

(75) Inventors: Mary Rose Crombez, Livonia, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 11/962,725

(22) Filed: Dec. 21, 2007

(65) Prior Publication Data

US 2009/0160227 A1 Jun. 25, 2009

(51) Int. Cl.
*A47C 13/00* (2006.01)

(52) U.S. Cl. ............ 297/113; 297/117; 297/463.1; 297/463.2; 297/183.1; 297/183.6; 297/238

(58) Field of Classification Search .......... 297/463.1, 297/463.2, 183.1, 183.6, 113, 411.32, 117, 297/238, 188.04, 183.7

See application file for complete search history.

(56) References Cited

U.S. PATENT DOCUMENTS

| | | | |
|---|---|---|---|
| 2,824,599 A | | 2/1958 | Quinlan |
| 3,168,346 A | * | 2/1965 | Rei, Jr. .................. 297/113 |
| 4,435,011 A | | 3/1984 | Hakamata |
| 4,601,515 A | * | 7/1986 | Hatsutta et al. ........ 297/362.12 |
| 4,690,455 A | | 9/1987 | Bailey et al. |
| 4,810,037 A | | 3/1989 | Takagi |
| 4,921,247 A | * | 5/1990 | Sterling .................. 482/138 |
| 4,943,112 A | * | 7/1990 | Law ........................ 297/238 |
| 4,973,017 A | * | 11/1990 | Takagi ................... 248/292.13 |
| 5,440,770 A | * | 8/1995 | Nichols .................... 5/655 |
| 5,700,054 A | * | 12/1997 | Lang ...................... 297/238 |
| 6,079,773 A | | 6/2000 | Hassan |
| 6,126,235 A | * | 10/2000 | Grove .................... 297/284.7 |
| 6,572,188 B2 | * | 6/2003 | Ozawa ..................... 297/238 |
| 7,114,772 B2 | | 10/2006 | Kobayashi et al. |
| 7,537,284 B1 | * | 5/2009 | Antorcha ............... 297/219.12 |
| 7,568,762 B2 | * | 8/2009 | Paulson ................. 297/219.12 |

(Continued)

FOREIGN PATENT DOCUMENTS

JP 06024264 A * 2/1994

(Continued)

OTHER PUBLICATIONS

Bilforumet; "Dabutcher: Volvo 780 Coupe Berone Turbo Prosjekt;" <http://www.volvo-power.net/pictures/admins/dabutcher/volvo_780_coupe_bertone_turbo/volvo_780_coupe_bertone_rear_seats.jpg>; Jun. 3, 2006; 2 pages.

(Continued)

*Primary Examiner*—Laurie K Cranmer
(74) *Attorney, Agent, or Firm*—Gregory Brown; Brooks Kushman P.C.

(57) ABSTRACT

A vehicle seat is provided with a seat back having a seating surface for supporting a back of an occupant. The seat back is adapted to be mounted to a vehicle and at least a portion of the seat back has a pivotal connection for movement from an upright position to a deployed position. A handle is mounted to the seating surface of the pivotal portion of the seat back. A cover is mounted to the seat back seating surface and extends over the handle.

20 Claims, 4 Drawing Sheets

U.S. PATENT DOCUMENTS

2003/0135954 A1* 7/2003 Beckwith .................... 16/422
2006/0097551 A1* 5/2006 Park et al. ................ 297/217.3
2008/0007390 A1* 1/2008 Wells et al. ............. 340/407.1

FOREIGN PATENT DOCUMENTS

JP          2001258678     *   9/2001

OTHER PUBLICATIONS

Grassroots Motorsports: The Hardcore Sports Car Magazine, 2007 Volkswagen Eos; <http://grassrootsmotorsports.com/news/032007/2007-volkwagen-eos-php>; Mar. 26, 2007; 2 pages.

Yahoo!7 Answers, "What is the thing in the middle of the back seat on a renault 19 cabriolet?;" <http:au.answers.yahoo.com/question/index.php?qid=2007100504317AAFgJHy>; Oct. 9, 2007; 7 pages.

* cited by examiner

COVER FOR VEHICLE SEAT HANDLE

BACKGROUND OF THE INVENTION

1. Field of the Invention

The invention relates to handles for vehicle seats.

2. Background Art

The prior art has provided vehicle seats that include portions that pivot relative to the vehicle. Some pivotal vehicle seats include vehicle seats that fold for extending a cargo area into the existing seating row by utilizing a back surface of the seat as a load floor. Other prior art pivotal seats include an armrest that is deployed from the seat such that the armrest provides a seating surface when in an upright position and provides an armrest to an adjacent seat when deployed.

The prior has provided handles for actuating the pivotal seats. These handles have included fabric or strap pull handles, which are attached to the pivotal portion so that the user may pull the handle to deploy the armrest or fold seat. Other handle variations include a firm plastic handle mounted to a seating surface of the pivotal portion of the seat so that the user may grasp the handle and pivot the armrest or seat back. Some prior art pivotal seats include a latch mechanism for maintaining the seat back or armrest in an upright position. Accordingly, some strap handles have been attached to a latch mechanism such that pulling of the handle disengages the latch mechanism and subsequently pivots the armrest or seat back. Likewise, seats with firm handles and a latch mechanism have been provided with a button for disengaging the latch mechanism.

SUMMARY OF THE INVENTION

An embodiment of the present invention discloses a vehicle seat having a seat back with a seating surface for supporting a back of an occupant. The seat back is adapted to be mounted to a vehicle. A portion of the seat back has a pivotal connection for movement from an upright position to a deployed position. A handle is mounted to the seating surface of the pivotal seat back. A cover is mounted to the seating surface and extends over the handle.

Another embodiment of the present invention provides that the cover is padded to provide comfort and safety to an occupant.

Yet another embodiment of the present invention discloses that the cover conceals the handle.

An even further embodiment of the present invention provides ornamental indicia upon an external surface of the cover.

The above embodiments and other embodiments, benefits, advantages and features of the present invention are readily apparent when taken from the following detailed description and the accompanying drawings.

DETAILED DESCRIPTION OF EMBODIMENTS OF THE PRESENT INVENTION

As required, detailed embodiments of the present invention are disclosed herein; however, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
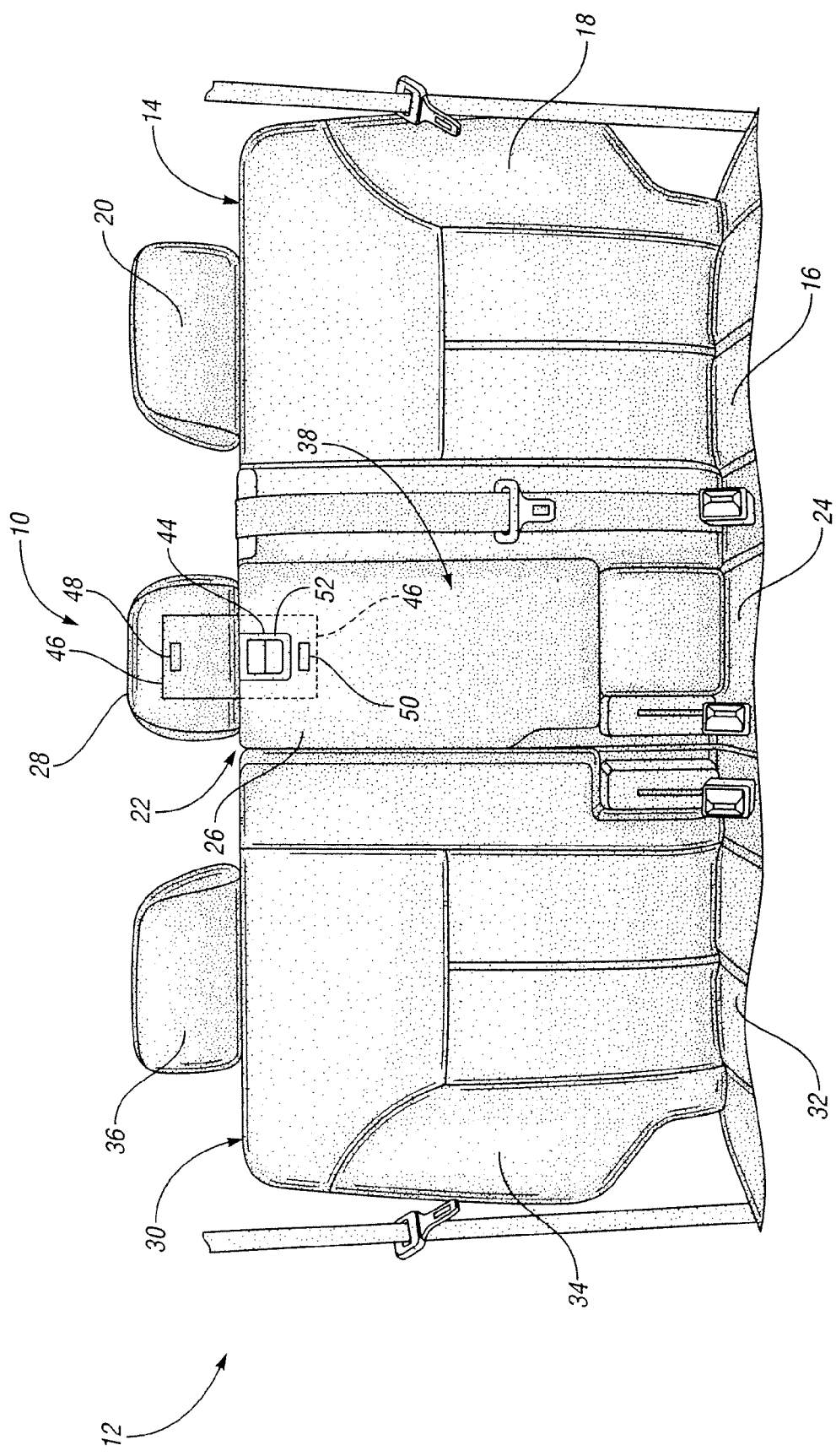
FIG. 1 is a front perspective view of a seating row of a vehicle in accordance with an embodiment of the present invention.

Referring now to FIG. 1, a seating row is illustrated and referenced generally by numeral 10. The seating row 10 is depicted within an environment of a vehicle 12. The seating row 10 is depicted as a bench seat with common seating surfaces for multiple seats. Of course, other seating arrangements are contemplated by the spirit and scope of the present invention. Additionally, the seating row 10 is illustrated as a rear seating row, such as a second seating row. However, the invention contemplates any seating row within the spirit and scope of the present invention.

The seating row 10 includes a first seat 14, which is on a driver side in markets such as the United States. The first seat 14 includes a seat bottom 16, a seat back 18 and a head restraint 20. A second seat 22 is provided having a seat bottom 24, a seat back 26 and a head restraint 28. In at least one embodiment, the seat backs 18, 26 of the first and second seats 14, 22 share a common frame. This common frame is split from a frame of a third vehicle seat 30, and is pivotally connected to the vehicle 12 for permitting a user to fold the seat backs 18, 26 for extending a cargo area into the seating row 10.

The third vehicle seat 30 is provided on a passenger side of the vehicle in some markets such as the United States. The passenger side seat 30 includes a seat bottom 32, a seat back 34 and a head restraint 36. The seat back 34 includes a frame that is separately pivotally connected to the vehicle 12 so that the passenger side seat 30 can be folded so that the seat bottom 32 lies upon the seat back 34 for extending a rear cargo area into the seating row 10. In the folded position, a rear surface of the seat back 34 provides a portion of a load floor for the cargo area.

The seating row 10 provides three individual seats 14, 22, 30 for seating three passengers. Each of the seat backs and seat bottoms 16, 18, 24, 26, 32, 34 provide seating surfaces for seating the occupant upon the respective seat 14, 22, 30. The seating row 10 may not always be fully occupied. In order to increase the comfort to passengers located in the driver side seat 14 or the passenger side seat 30, an armrest 38 is provided in the middle seat 22.

Figure 2:
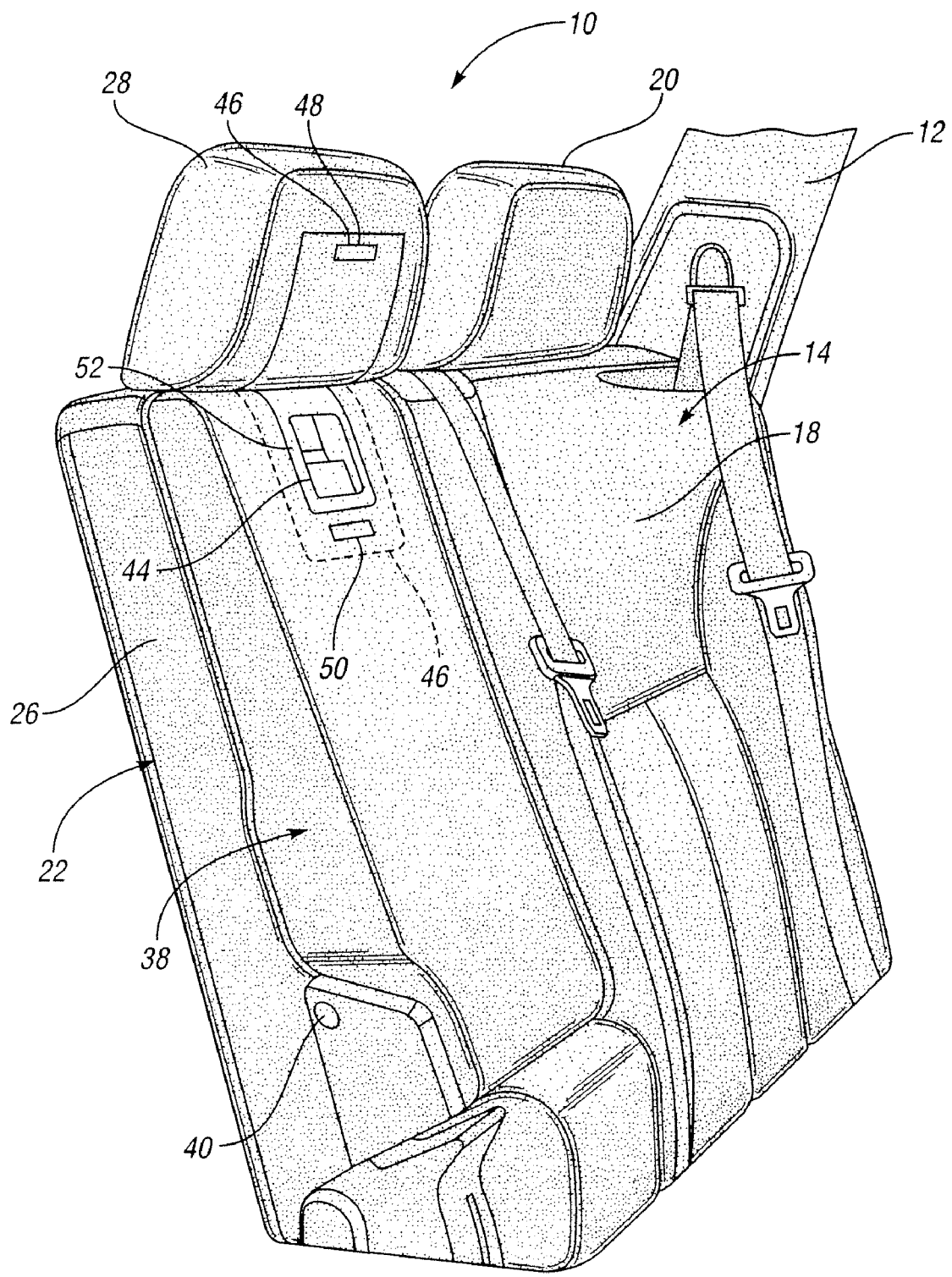
FIG. 2 is a side perspective view of a portion of the seating row of FIG. 1.
Figure 3:
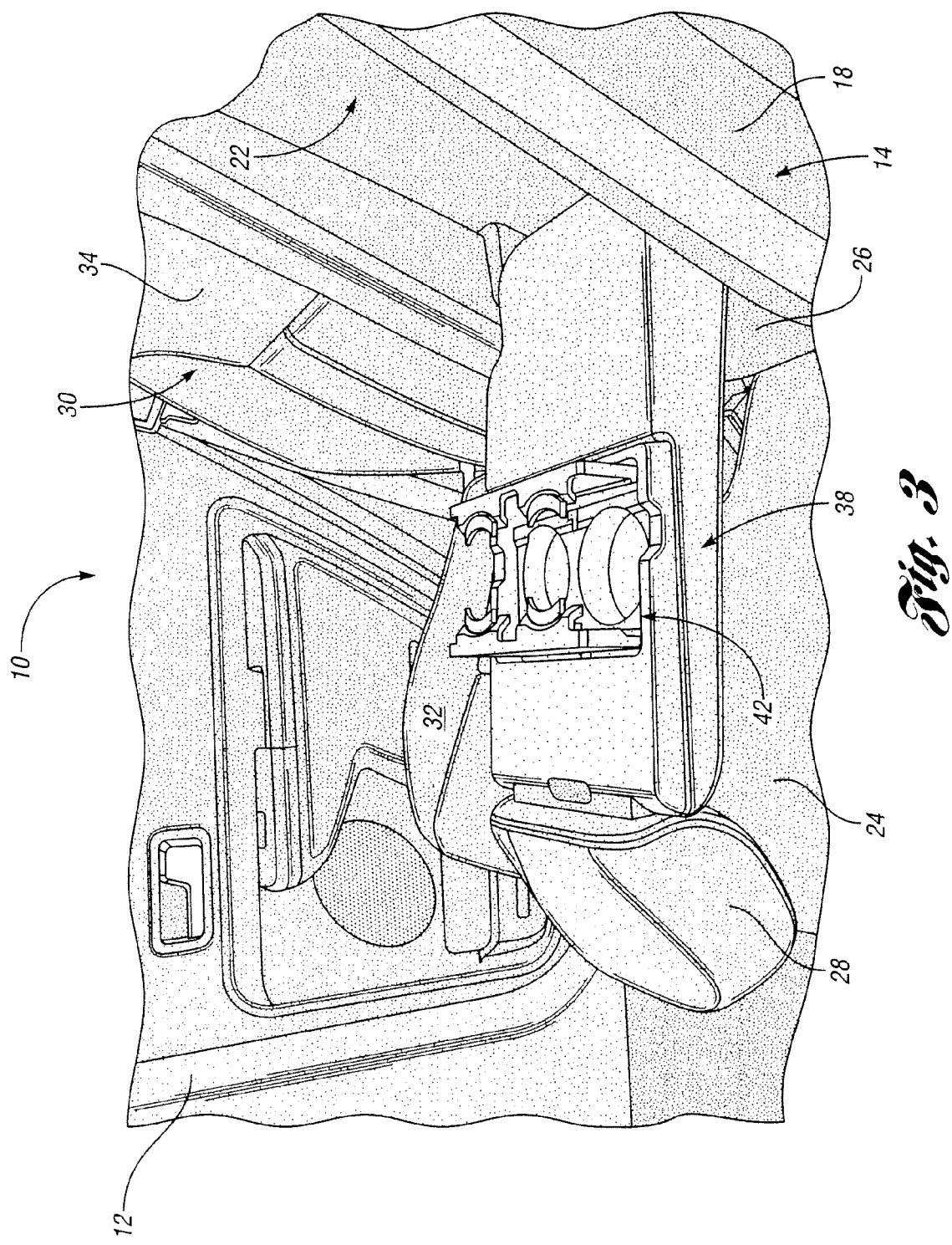
FIG. 3 is another side perspective view of the seating row of FIG. 1, illustrated with a portion of the seating row in a deployed position.

Referring now to FIGS. 1-3, the armrest 38 provides a portion of the seating surface of the seat back 26. The armrest 38 has a pivotal connection 40 (FIG. 2) with the seat back 26. FIGS. 1 and 2 illustrate the armrest 38 in an upright position for supporting an occupant when seated in the middle seat 22. Referring now to FIG. 3, the armrest 38 can be pivoted about the pivotal connection 40 to a deployed position for supporting the arm of a passenger seated in either or both of the driver side seat 14 and the passenger side seat 30. Additionally, the armrest 38 may employ ancillary comfort features, such as a cup holder 42 as illustrated in FIG. 3.

Pivotal connections for armrests 38 to seat backs 26 are known in the art. Such connections may employ inertia locks to prevent inadvertent deployment; or inadvertent bouncing of the armrest 38 while deployed as a result of shock or vibrations imparted to the vehicle. Additionally, the pivotal connection may include detents that are engaged by spring biased members for requiring an additional force to urge the armrest 38 out of either of the stowed or deployed positions. Additionally, the armrest 38 may cooperate with the seat back 26 via a latching mechanism for securing the armrest 38 in either position. If a latching mechanism is employed for securing the armrest 38 in the stowed position, a button, lever or other manual actuation mechanism may be provided on the armrest 38 for disengaging the latch mechanism.

In order to facilitate deployment of the armrest 38, the armrest 38 is provided with a pull handle 44 at a top center region of the seating surface on the armrest 38. The pull handle 44 is recessed into the seating surface of the seat back 34 and is oriented generally flush with the seating surface to avoid disrupting comfort. The pull handle 44 is provided, for example, by a molded polymeric material such as acrylonitrile-butadiene-styrene (ABS). A recessed handle such as the handle 44 provides advantages over the strap handles of the prior art in that the handle 44 is a firm, secure handle and eliminates the utilization of fabric straps extending from portions of the seat 22, which may disrupt or obfuscate the overall ornamental design and appearance of the seating row 10. However, when a short stature occupant sits in the middle seat 22, such as an occupant under five feet in height, for example a child, the occupant may rest his or her head against the handle 44. The firm handle 44 may be uncomfortable and/or inconvenient to the occupant. Accordingly, an additional flap or cover 46 is provided on the armrest 38 to cover the handle 44.

The cover 46 is a flexible padded fabric cover 46 that is pivotally connected to the armrest 38, which may be lifted as illustrated in solid in FIGS. 1 and 2 to reveal the underlying handle 44. Ordinarily, the cover 46 extends over the handle 44 as illustrated in phantom in FIGS. 1 and 2 to increase comfort and safety to an occupant seated in the middle seat 22. Although the cover 46 is illustrated with a top region of the cover 46 connected to the armrest 38, the invention contemplates any connection of the cover 46 to the armrest 38 within the spirit and scope of the present invention.

In order to maintain the cover 46 in the ordinary position covering the handle 44, as illustrated in phantom in FIGS. 1 and 2, a pair of connection members may be employed. For example, a first connection member 48 is illustrated on an underside of the cover 46 at a bottom region of the cover 46. Likewise, a second connection member 50 is provided on the armrest 36 for securing the cover 46 in the closed position. The first and second connection members 48, 50, under one embodiment of the invention, are each formed from one of a hook and loop fabric material for securing the cover 46 in the closed orientation. In order to access the handle 44, the passenger lifts the cover 46 thereby disengaging the connection members 48, 50 and then grasps the handle 44. The cover 46 may be sewn directly to the seating surface cover of the armrest 38.

Figure 4:
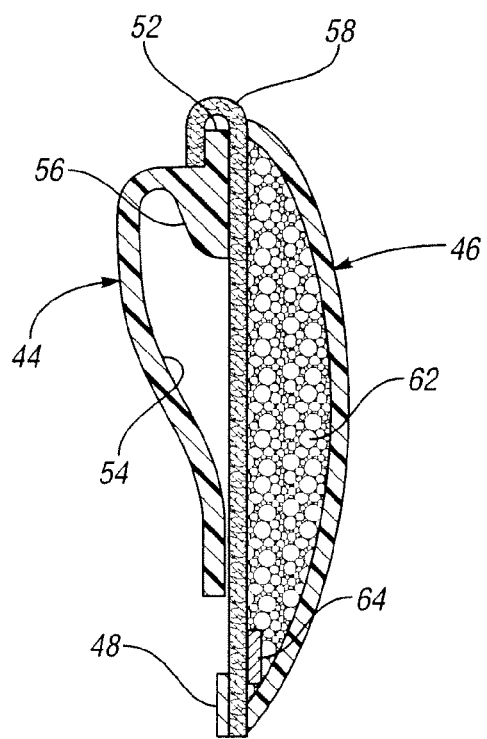
FIG. 4 is a section view of a handle and a cover for a vehicle seat in accordance with an embodiment of the present invention.

Referring now to FIG. 4, the handle 44 and cover 46 are illustrated in greater detail. The handle 44 includes a flange 52 that extends about its periphery and is oriented generally flush with the seating surface of the seat back 26. The handle 44 includes a recess 54 for receiving a hand of an occupant. The handle 44 also includes a grip portion 56 so that the occupant can grasp the handle 44 and thereby move the armrest 38. Although the grip portion 56 is illustrated at an upper region, the invention contemplates that the grip portion 56 may be oriented at any region of the handle 44, such as a lower region, a central region or the like.

The cover 46 is illustrated with a first fabric portion 58, which may be sewn to the seating surface cover of the armrest 38, or may be attached to the armrest 38 by extending beneath the flange 52 illustrated in FIG. 4, which is thereby fastened directly to the armrest 38. The cover 46 also includes a second fabric portion 60 for collectively retaining foam 62 or other padding within the cover 46. The foam 62 adds to the comfort and safety of the occupant. The fabric portions 58, 60 may be formed from a common material as that of the seating surface of the seating row 10. Thus, the fabric portions 58, 60 may be formed by any suitable seating fabric, or leather, or an artificial material, or the like.

The cover 46 is illustrated with the first connection member 48 on an external surface for engaging the second connection member 50. Rather than require direct contact of the connection members, which is required for hook and loop fabric materials, a first magnet 64 may be provided within the cover 46 secured at a bottom region. Likewise, the second connection member 50 of the armrest 38 may also be a magnet that is provided on the seating surface or beneath the seating surface for retaining the cover 46 against the armrest 38.

Figure 5:
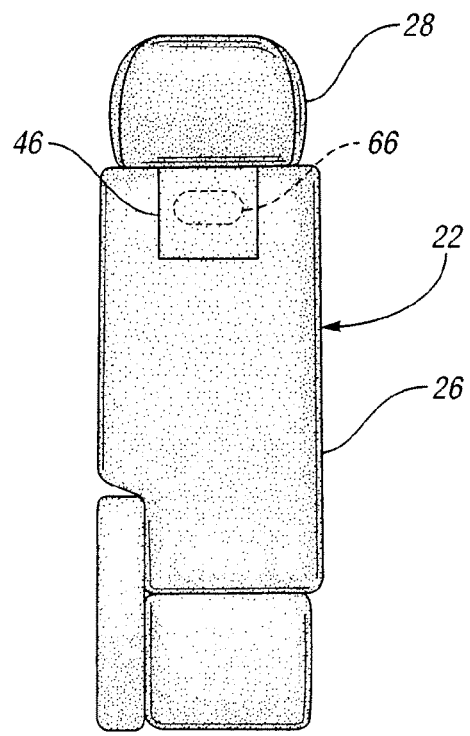
FIG. 5 is a front elevation view of another vehicle seat embodiment according to the present invention.

Referring now to FIG. 5, the middle seat 22 is illustrated with a cover 46 extending over the handle 44 in the ordinary rest position of the cover 46. As illustrated, the cover 46 conceals the handle 44 so that the handle does not distract from or obfuscate the overall look and appearance of the seating row 10. Additionally, the cover 46 may be decorative. For example, an indicia 66 such as a badge, logo, or the like may be provided upon the cover 46 thereby enhancing an overall ornamental look and appearance of the seating row 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle seat comprising:
   a seat back having a seating surface for supporting a back of an occupant, the seat back being adapted to be mounted to a vehicle, at least a portion of the seat back having a pivotal connection for movement from an upright position to a deployed position;
   a firm handle mounted to the seating surface of the at least a portion of the seat back; and
   a padded cover mounted to the seat back seating surface and extending over the handle to conceal the handle and provide comfort and safety to an occupant in the upright position of the at least a portion of the seat back.

2. The vehicle seat of claim 1 wherein the cover is pivotally connected to the seat back above the handle.

3. The vehicle seat of claim 1 wherein a top region of the cover is affixed to the seat back above the handle.

4. The vehicle seat of claim 3 further comprising:
   a first connection member mounted to a bottom region of the cover; and
   a second connection member mounted to the seat back seating surface beneath the handle for securing the cover over the handle.

5. The vehicle seat of claim 4 wherein the first and second connection members further comprise a hook and loop material.

6. The vehicle seat of claim 4 wherein the first and second connection members further comprise a pair of magnets.

7. The vehicle seat of claim 1 wherein a top region of the cover is sewn to the seat back above the handle.

8. The vehicle seat of claim 1 wherein the handle is formed from a polymeric material.

9. The vehicle seat of claim 1 wherein the handle is further defined as a pull handle.

10. The vehicle seat of claim 9 wherein the handle is recessed into the seat back.

11. The vehicle seat of claim 10 wherein the handle is flush with the seating surface.

12. The vehicle seat of claim 1 wherein the at least a portion of the seat back further comprises an armrest pivotally connected to the seat back for providing a seating surface in the upright position and for providing an armrest to an adjacent seat in the deployed position.

13. The vehicle seat of claim 1 wherein the handle is oriented at an upward region of the seat back.

14. The vehicle seat of claim 1 further comprising a head restraint extending from the seat back for supporting a head of an occupant, the head restraint being spaced apart from the handle.

15. The vehicle seat of claim 14 wherein the head restraint is separate from the cover.

16. The vehicle seat of claim 1 wherein the seat is further defined as a bench seat.

17. The vehicle seat of claim 1 wherein a top region of the cover is secured between a back surface of the handle and the seat back.

18. The vehicle seat of claim 1 further comprising ornamental indicia provided upon an external surface of the cover.

19. A vehicle seat comprising:
a seat back having a seating surface for supporting a back of an occupant, the seat back being adapted to be mounted to a vehicle, at least a portion of the seat back having a pivotal connection for movement from an upright position to a deployed position;
a firm handle mounted to the seating surface of the at least a portion of the seat back; and
a padded flap mounted to the seat back seating surface and extending over the handle to conceal the handle and provide comfort and safety to an occupant in the upright position of the at least a portion of the seat back.

20. A vehicle bench seat comprising:
a seat back having a pair of seating surfaces, each for supporting a back of an occupant, the seat back being adapted to be mounted to a vehicle;
an armrest pivotally connected to the seat back for providing a portion of one of the seating surfaces in an upright position and for providing an armrest to the other seating surface in a deployed position;
a pull handle formed from a firm polymeric material mounted to the at least a portion of the seat back and recessed within the seating surface; and
a padded cover mounted to the seat back seating surface and extending over the handle to conceal the handle and provide comfort and safety to an occupant in the upright position of the at least a portion of the seat back, wherein a top region of the cover is affixed to the seat back above the handle.

* * * * *